United States Patent
Wang

(10) Patent No.: US 7,938,607 B2
(45) Date of Patent: May 10, 2011

(54) METAL PLATE MEMBER FIXATION DEVICE

(76) Inventor: Kuo-Chung Wang, Yunlin County (TW)

( * ) Notice: Subject to any disclaimer, the term of this patent is extended or adjusted under 35 U.S.C. 154(b) by 78 days.

(21) Appl. No.: 12/571,750

(22) Filed: Oct. 1, 2009

(65) Prior Publication Data

US 2011/0081218 A1  Apr. 7, 2011

(51) Int. Cl.
*F16B 39/00* (2006.01)
(52) U.S. Cl. .......................... 411/107; 411/353
(58) Field of Classification Search ............... 411/103, 411/107, 353, 999, 352, 970
See application file for complete search history.

(56) References Cited

U.S. PATENT DOCUMENTS

| | | | | |
|---|---|---|---|---|
| 3,180,389 | A | * | 4/1965 | Frank ........................ 411/350 |
| 4,884,930 | A | * | 12/1989 | Dobbeler ........................ 411/6 |
| 5,338,139 | A | * | 8/1994 | Swanstrom ................ 411/353 |
| 5,544,992 | A | * | 8/1996 | Ciobanu et al. ............. 411/353 |
| 6,095,736 | A | * | 8/2000 | Miller et al. ................ 411/352 |
| 6,280,131 | B1 | * | 8/2001 | Ellis et al. .................. 411/353 |
| 6,309,158 | B1 | * | 10/2001 | Bellinghausen et al. ..... 411/353 |
| 2003/0063960 | A1 | * | 4/2003 | Allen ........................ 411/107 |
| 2005/0019133 | A1 | * | 1/2005 | Allen et al. ................ 411/353 |

* cited by examiner

*Primary Examiner* — Gary Estremsky
(74) *Attorney, Agent, or Firm* — Muncy, Geissler, Olds & Lowe, PLLC

(57) ABSTRACT

A metal plate member fixation device includes a barrel for bonding to a mounting through hole of a first metal plate member, a lock screw bolt inserted through the barrel for threading into a screw hole of a second metal plate member to lock the first and second metal plate members together, a cap molded on the head of the lock screw bolt, a spring member sleeved onto the shank of the lock screw bolt and stopped against the shoulder of the lock screw bolt and an annular inside step of the barrel, and a compressively deformable annular stop member positioned in an annular inside locating groove in the barrel around the shank of the lock screw bolt for stopping against one end of the thread of the lock screw bolt to prohibit escape of the lock screw bolt from the barrel.

11 Claims, 8 Drawing Sheets

METAL PLATE MEMBER FIXATION DEVICE

BACKGROUND OF THE INVENTION

1. Field of the Invention

The present invention relates to a metal plate member fixation device for joining two metal plate members and more particularly, to such a metal plate member fixation device, which uses a compressively deformable annular stop member to secure a lock screw bolt to a barrel, allowing the lock screw bolt to be moved axially relative to the barrel and prohibiting escape of the lock screw bolt from the barrel.

2. Description of the Related Art

When fastening plate members together, a positioning screw formed of a knob, a ring and a screw nail is usually used. During installation, the screw nail and the ring are secured to the first plate member, and then the knob is rotated to drive the screw nail into the second plate member, and then a hand tool is used to fasten tight the screw nail, affixing the first and second plate members together. This plate member joining method can be used in a machine tool to join plate members together.

The power drive and speed-adjustment unit of a machine tool are generally provided inside the housing. To facilitate repair of a machine tool or adjustment of the output speed of a machine tool, a detachable plate member is usually provided at the housing of the power drive or speed-adjustment unit. Screw bolts are commonly used to fasten the movable plate member to the housing. When unfastening screw bolts to dismount a movable plate member from the housing, the associating lock nuts may fall from the screw bolts. This movable plate member mounting and dismounting procedure is complicated, wasting much time and labor.

There is known a metal plate member fixation device comprised of a cap, a screw bolt, a spring member and a locating base for joining two metal plate members together. After fixation of the locating base of the metal plate member fixation device to a through hole on a first plate member, the screw bolt is threaded into a screw hole on a second plate member to secure the first plate member and the second plate member together. Because the locating base of the metal plate member fixation device is kept secured to the first plate member after removal of the first plate member from the second plate member, the metal plate member fixation device will not be missed by accident. According to this design, the cap is a metal member. After the screw bolt is accommodated in the cap, a machine tool is used to process the cap so that retaining protrusions are formed on the cap and forced into engagement with the screw bolt. This processing process requires high precision and wastes time and labor. During processing, the cap may be compressed excessively, resulting in permanent deformation.

Therefore, it is desirable to provide a metal plate member fixation device that eliminates the aforesaid problems.

SUMMARY OF THE INVENTION

The present invention has been accomplished under the circumstances in view. It is therefore an object of the present invention to provide a metal plate member fixation device for joining metal plate members, which facilitates installation and presents disconnection between component parts.

To achieve these and other objects of the present invention, a metal plate member fixation device comprises a barrel for bonding to a first metal plate member, a locking device, which comprises a lock screw bolt axially slidably coupled to the barrel for inserting through a mounting through hole on the first metal plate member and threading into a screw hole on a second metal plate member to lock the first metal plate member and the second metal plate member together and a cap fixedly located on the head of the lock screw bolt, a spring member received in the cap and stopped between the shoulder of the lock screw bolt and an annular inside step inside the barrel, and a compressively deformable annular stop member set in the barrel around the shank of the lock screw bolt and forced into an annular inside locating groove inside the barrel to secure the lock screw bolt to the barrel for allowing axial movement of the lock screw bolt relative to the barrel and stopping against one end of the thread of the lock screw bolt to prohibit escape of the lock screw bolt of the locking device from the barrel. Further, the compressively deformable annular stop member can be formed of a conical metal spring washer, an internal tooth washer, or a conical plastic washer.

DETAILED DESCRIPTION OF THE PREFERRED EMBODIMENT

Figure 1:
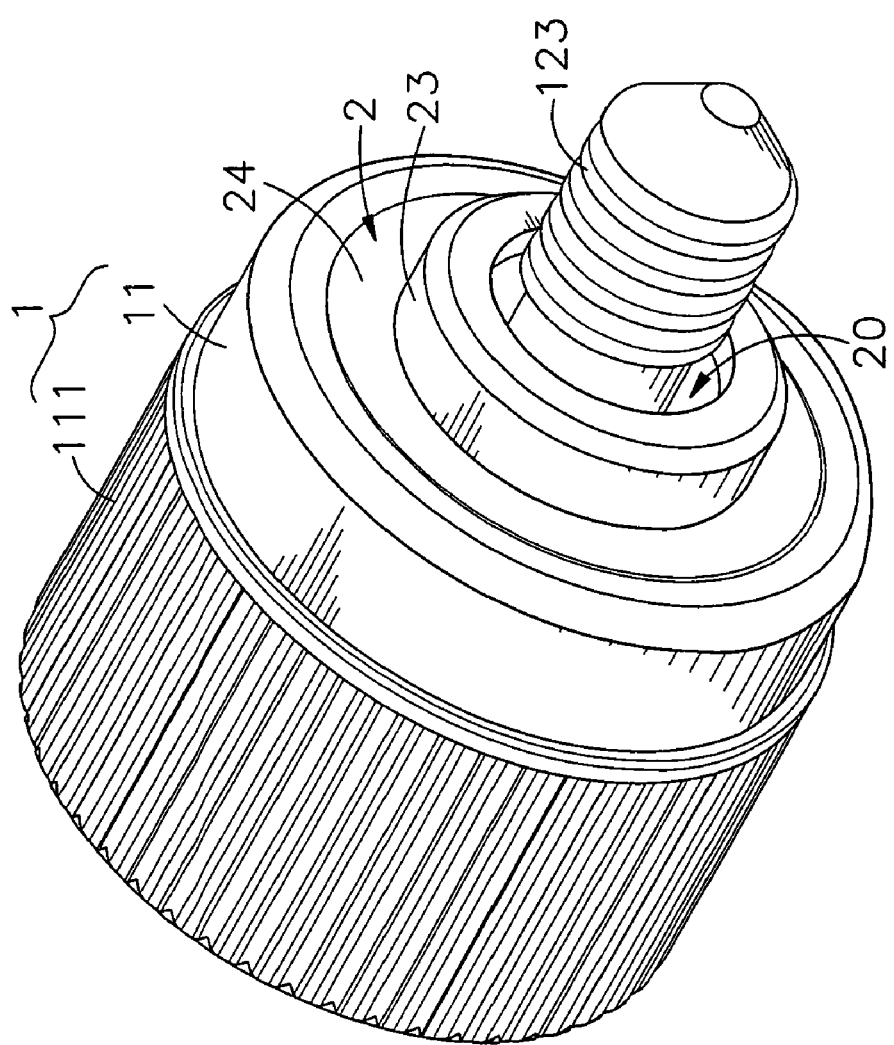
FIG. 1 is an elevational view of a metal plate member fixation device in accordance with a first embodiment of the present invention.
Figure 2:
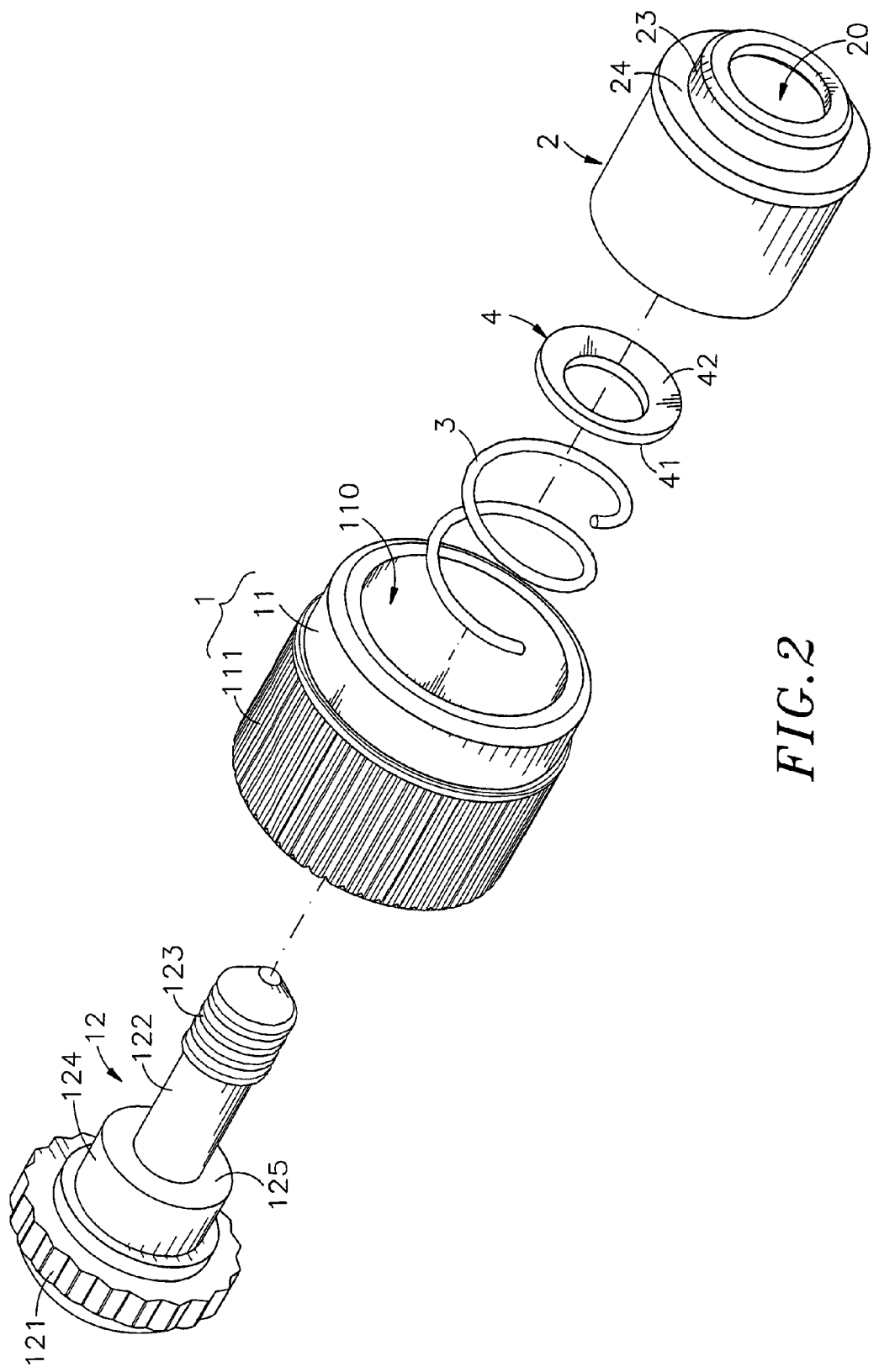
FIG. 2 is an exploded view of the metal plate member fixation device in accordance with the first embodiment of the present invention.
Figure 3:
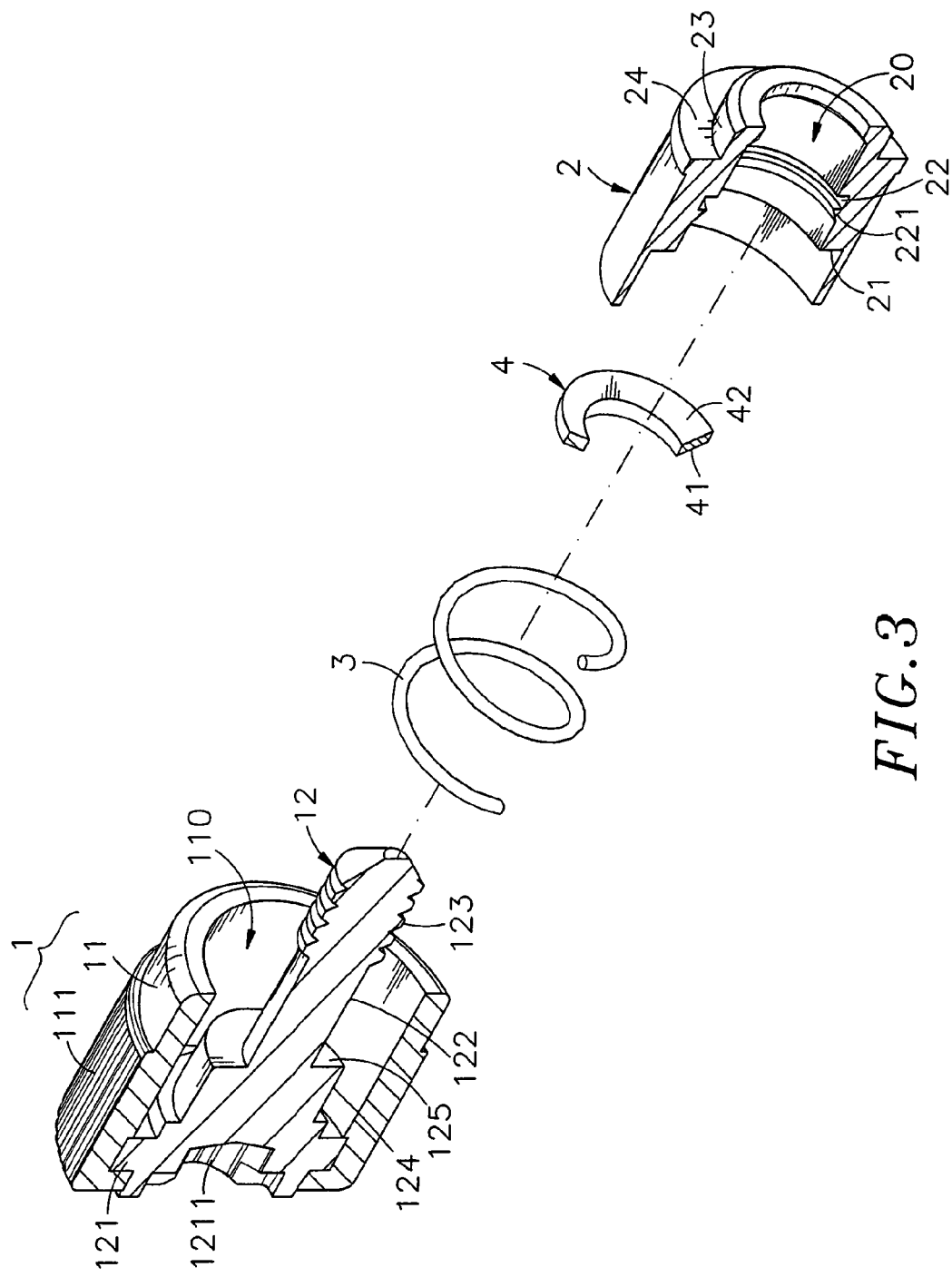
FIG. 3 is an exploded view in section of the metal plate member fixation device in accordance with the first embodiment of the present invention.

Referring to FIGS. 1-3, a metal plate member fixation device in accordance with a first embodiment of the present invention is shown comprising a locking device 1, a barrel 2, a spring member 3, and an annular stop member 4.

The locking device 1 comprises a cap 11 and a lock screw bolt 12. The cap 11 is a hollow member having a center opening 110 axially extending through the top and bottom sides for receiving the barrel 2, the lock screw bolt 12 and the spring member 3, and a grip 111 located on the periphery for gripping by hand. The lock screw bolt 12 is a metal screw bolt having a head 121, a shank 122 perpendicularly extended from the center of the bottom wall of the head 121, a thread 123 spirally extending around the periphery of the shank 122, a shoulder 124 connected between the bottom wall of the head 121 and the shank 122 and having a bottom stop wall 125 disposed around one end of the shank 122, and a tool groove 1211 located on the top wall of the head 121.

The barrel 2 is a hollow cylindrical metal member having a mounting hole 20 extending through top and bottom sides thereof for the passing of the shank 122 of the lock screw bolt 12, an annular inside step 21 extending around the inside wall thereof inside the mounting hole 20, an annular inside locating groove 22 extending around the inside wall inside the mounting hole 20, a beveled inside protrusion 221 protruded from the inside wall inside the mounting hole 20 and extending along one side of the annular inside locating groove 22, a bonding flange 24 located on the bottom side around the mounting hole 20 and a bottom extension tube 23 perpendicularly extended from the bonding flange 24 around the mounting hole 20.

The spring member 3 is sleeved onto the lock screw bolt 12, having two distal ends respectively stopped against the bottom stop wall 125 of the shoulder 124 of the lock screw bolt 12 and the annular inside step 21 of the barrel 2.

The annular stop member 4 is compressively deformable and mounted in the mounting hole 20 of the barrel 2, having a top bearing surface 41 for bearing a pressure from the bottom stop wall 125 of the shoulder 124 of the lock screw bolt 12 and a bottom stop surface 42 for positioning in the annular inside locating groove 22 of the barrel 2 to stop against the thread 123 of the lock screw bolt 12 to further prohibit escape of the lock screw bolt 12 from the barrel 2 after the metal plate member fixation device has been assembled.

The aforesaid lock screw bolt 12 is made of metal. The cap 11 is directly molded on the head 121 of the lock screw bolt 12 with over-molding technology. Alternatively, the cap 11 can be separately made and then affixed to the lock screw bolt 12 by means of any of a variety of fastening techniques. In this case, male engagement means, such as barbs, threads or teeth, may be formed on the periphery of the head 121 of the lock screw bolt 12 for engagement with female engagement means, such as grooves on the inside wall of the cap 11. When the cap 11 and the lock screw bolt 12 are molded or fastened together, a user can drive the grip 111 to rotate the lock screw bolt 12 into the workpiece. The annular stop member 4 can be a spring washer made from brass, zinc alloy, aluminum or any other metal materials having high extensibility. Alternatively, the annular stop member 4 can be molded from elastic plastics. Further, the annular stop member 4 is shaped like a hollow, rounded dish, compressible by the bottom stop wall 125 of the shoulder 124 of the lock screw bolt 12 into a flat shape to stop against one end of the thread 123 of the lock screw bolt 12 and to further prohibit escaping of the lock screw bolt 12 from the barrel 2.

Figure 4:
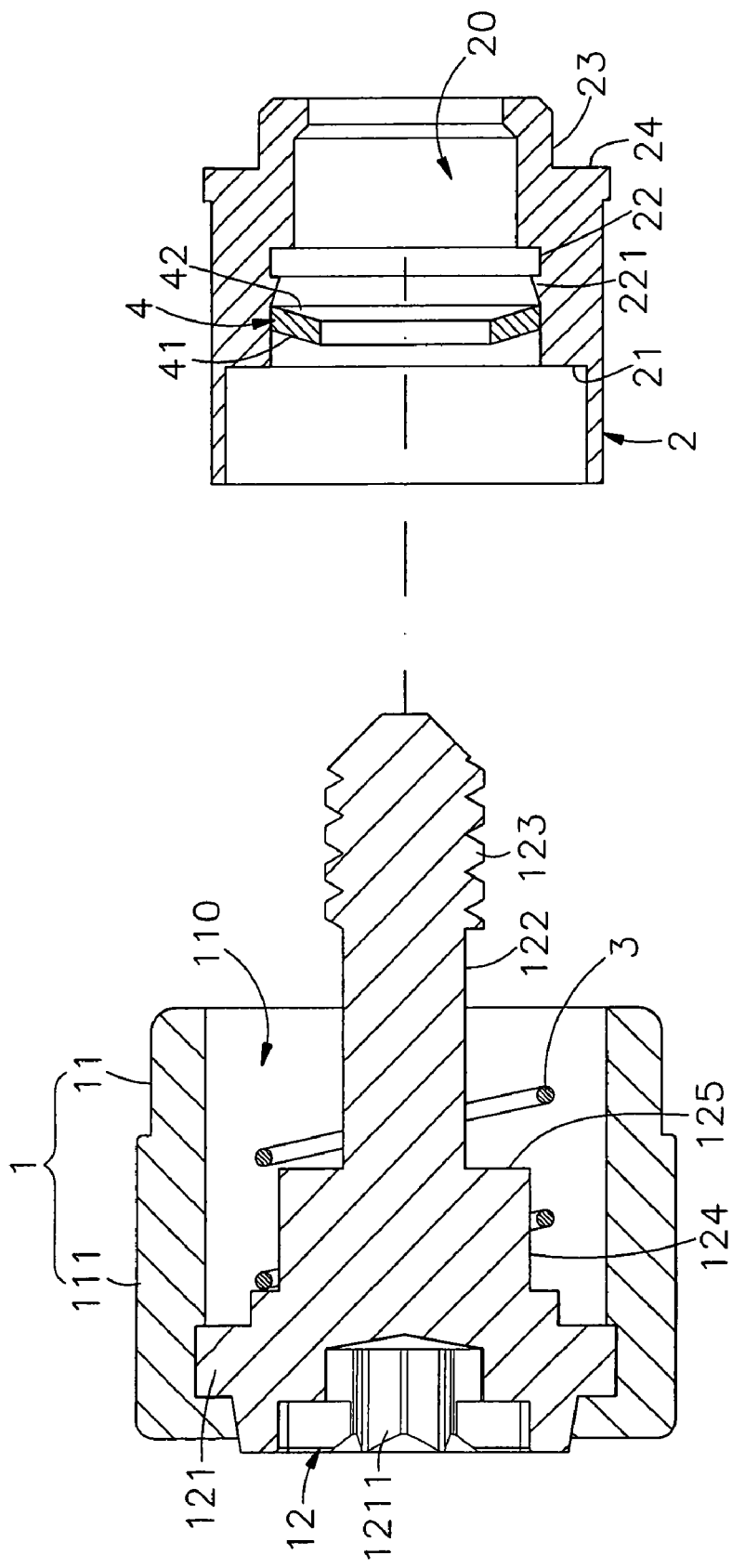
FIG. 4 is a sectional assembly view of the metal plate member fixation device in accordance with the first embodiment of the present invention, showing the annular stop member and the spring member respectively mounted in the barrel and the locking device before coupling of the barrel to the locking device.
Figure 5:
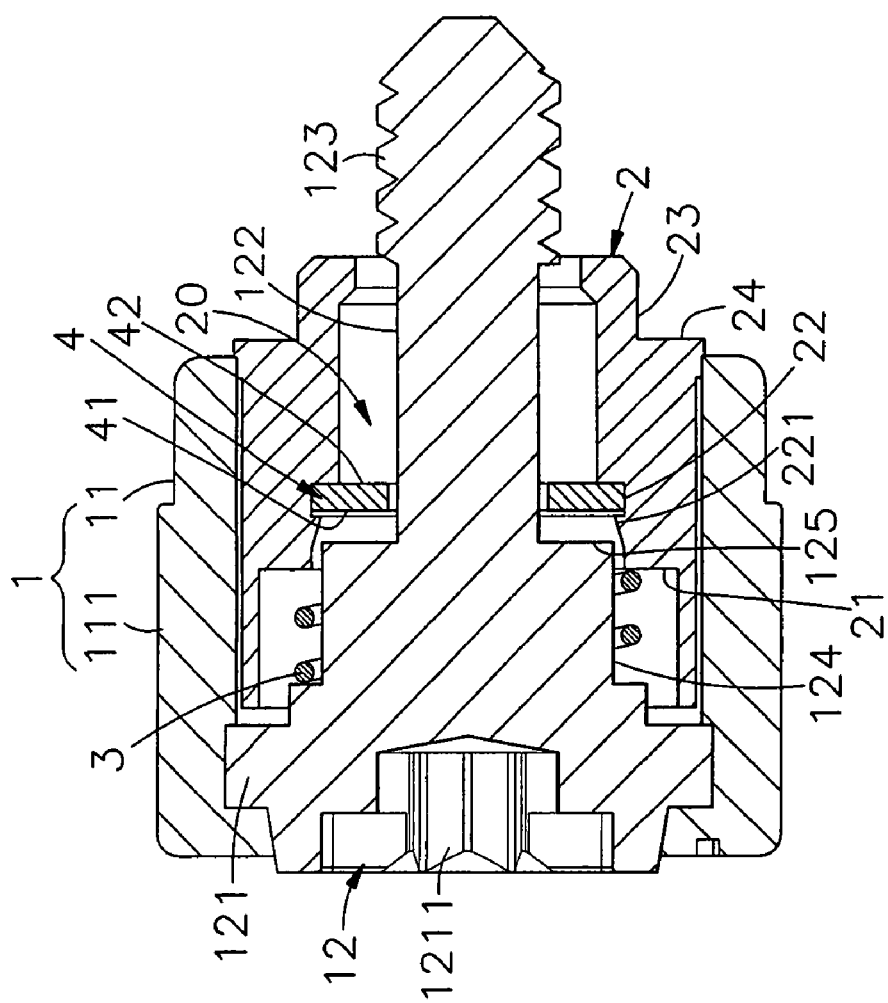
FIG. 5 is a sectional view of the first embodiment of the present invention, showing the metal plate member fixation device assembled.

Referring to FIGS. 4 and 5 and FIGS. 1-3 again, during assembly process of the metal plate member fixation device, sleeve the spring member 3 onto the shank 122 of the lock screw bolt 12 to have one end of the spring member 3 be stopped at the bottom stop wall 125 of the shoulder 124 of the lock screw bolt 12, and then insert the annular stop member 4 into the mounting hole 20 of the barrel 2, and then insert the barrel 2 into the center opening 110 of the cap 11 to force the annular inside step 21 of the barrel 2 against the other end of the spring member 3. When continuously forcing the barrel 2 against the spring member 3 and the locking device 1, the thread 123 of the lock screw bolt 12 will pass through the annular stop member 4 to the outside of the barrel 2, and the bottom stop wall 125 of the lock screw bolt 12 will be forced against the top bearing wall 41 of the annular stop member 4, causing the annular stop member 4 to be compressed into a flat shape and moved over the beveled inside protrusion 221 and then positioned in the annular inside locating groove 22. After positioning of the annular stop member 4 in the annular inside locating groove 22 inside the barrel 2, release the pressure from the barrel 2 for enabling the spring member 3 to move the locking device 1 in direction away from the barrel 2. At this time, the thread 123 of the lock screw bolt 12 suspends inside the barrel 2 and the annular stop member 4 is kept in the flat shape and positioned in the annular inside locating groove 22 and stopped against one end of the thread 123 to prohibit escape of the lock screw bolt 12 from the barrel 2. Thus, the lock screw bolt 12 is axially movably coupled to the barrel 2 and the annular stop member 4 for installation.

Figure 6:
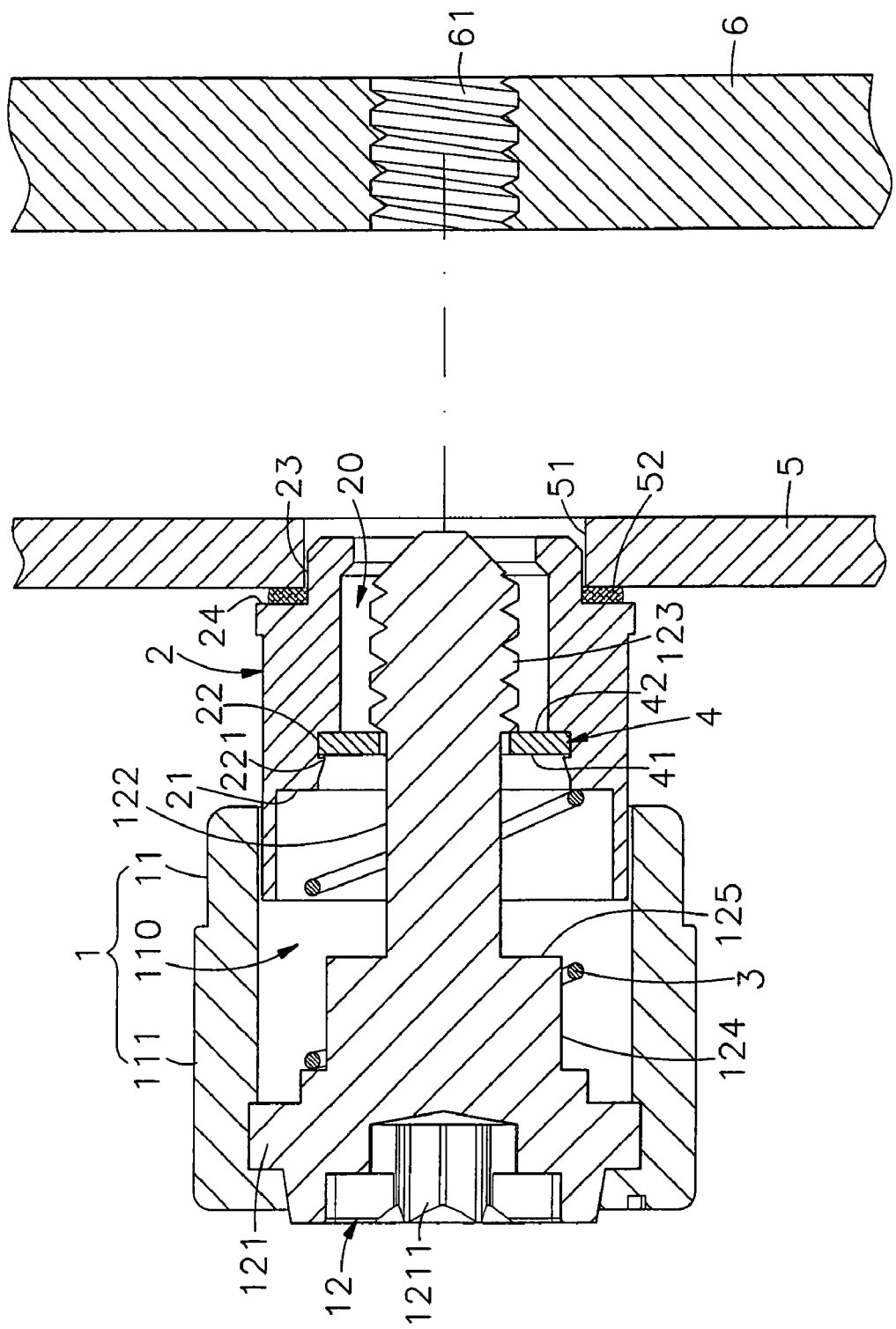
FIG. 6 is a schematic sectional applied view of the first embodiment of the present invention, showing the barrel of the metal plate member fixation device bonded to a first metal plate member.
Figure 7:
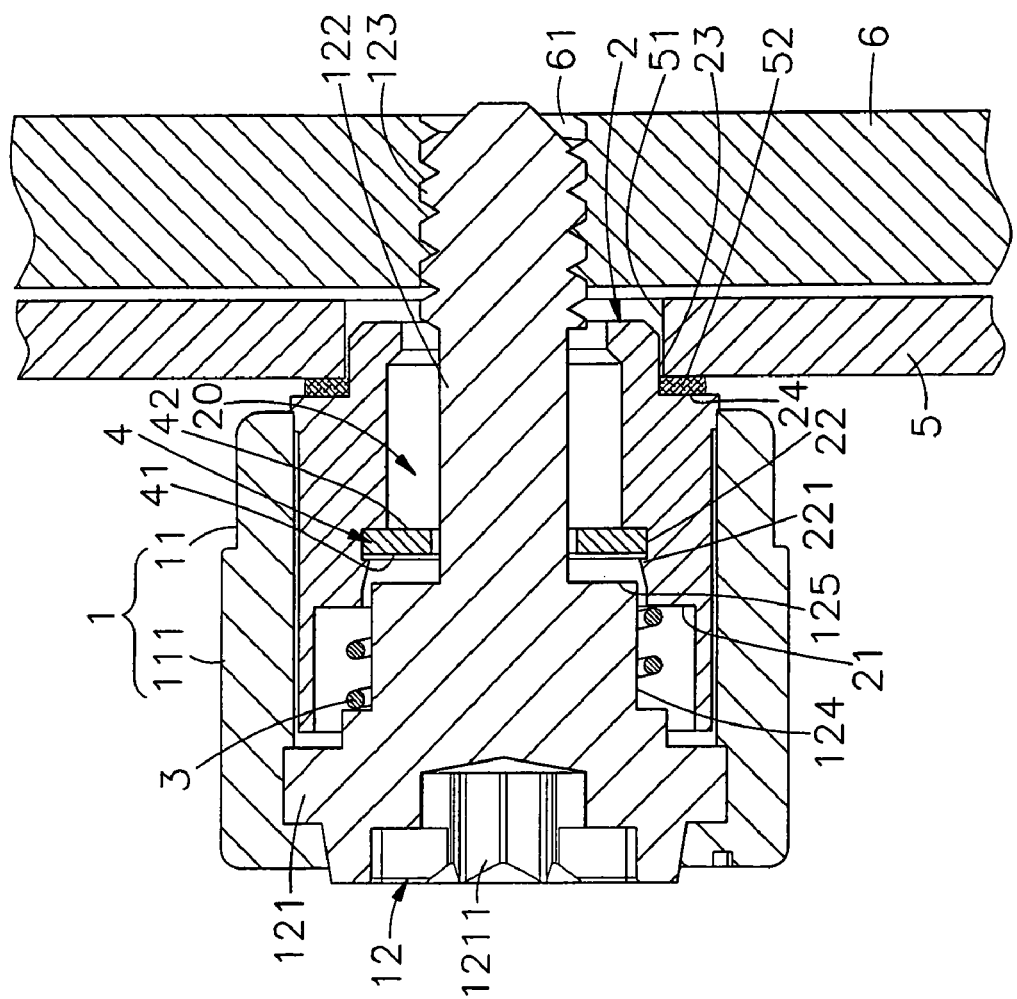
FIG. 7 corresponds to FIG. 6, showing the first metal plate member attached to the second metal plate member and the lock screw bolt of the locking device fastened to the screw hole of the second metal plate member.

Referring to FIGS. 6 and 7, during application, press-fit the bottom extension tube 22 of the barrel 2 into a mounting through hole 51 of a first metal plate member 5 to attach the bonding flange 24 of the barrel 2 to the solder paste 52 being applied to the border area of the mounting through hole 51 of the first metal plate member 5. Alternatively, an automatic installation machine can be used to pick up the metal plate member fixation device and then to insert the bottom extension tube 22 of the barrel 2 of the metal plate member fixation device into the mounting through hole 51 of the first metal plate member 5 tightly. Thereafter, a reflow soldering process is applied to bond the barrel 2 to the first metal plate 5.

After installation of the barrel 2 in the first metal plate member 5, attach the first metal plate member 5 to a second metal plate member 6 to keep the mounting through hole 51 of the first metal plate member 5 in alignment with one screw hole 61 of the second metal plate member 6, and then force the cap 11 downwards and rotate the grip 111 of the cap 11 to drive the outer thread 123 of the lock screw bolt 12 into the screw hole 61 of the second metal plate member 6, and then attach a hand tool (for example, screwdriver) to the tool groove 1211 of the head 121 of the lock screw bolt 12 and rotate the hand tool to tighten up the connection between the lock screw bolt 12 and the second metal plate member 6. Thus, the first metal plate member 5 and the second metal plate member 6 are locked together. When wishing to dismount the first metal plate member 5 from the second metal plate member 6, rotate the cap 11 in the reversed direction to disengage the thread 123 of the lock screw 12 from the screw hole 61 of the second metal plate member 6, allowing removal of the first metal plate member 5 from the second metal plate member 6.

Figure 8:
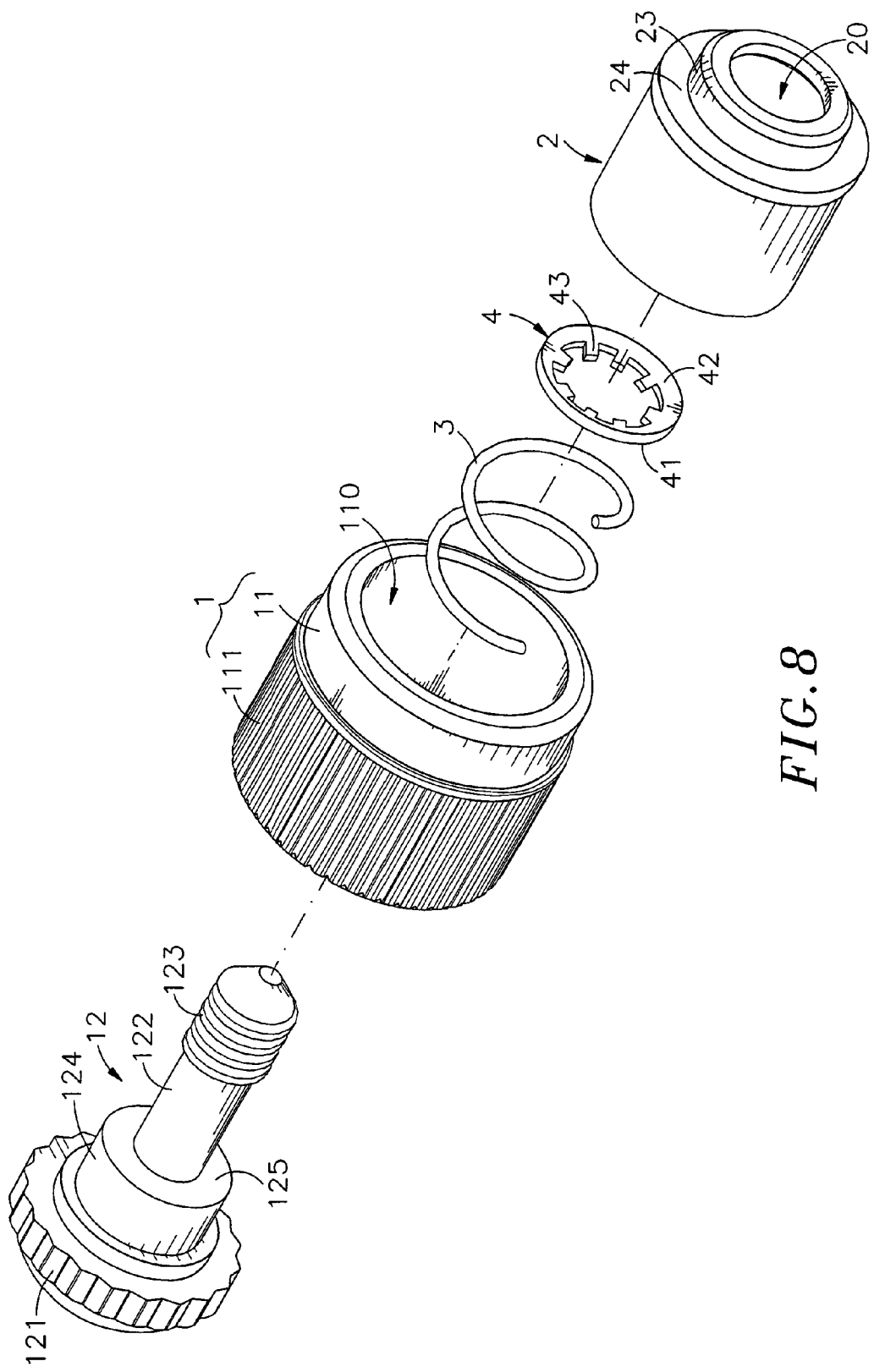
FIG. 8 is an exploded view in sectional elevation of a metal plate member fixation device in accordance with a second embodiment of the present invention.

FIG. 8 is an exploded view of a metal plate member fixation device in accordance with a second embodiment of the present invention. This second embodiment is substantially similar to the aforesaid first embodiment with the exception of the structure of the annular stop member 4. According to this second embodiment, the annular stop member 4 is an internal tooth washer having a plurality of teeth 43 equiangularly spaced around the inside wall thereof. When the annular stop member 4 is not compressed, the thread 123 of the lock screw bolt 12 can be inserted through the stop member 4. When the stop member 4 is compressed into a flat shape after insertion of the shank 122 of the lock screw bolt 12 through the stop member 4, the teeth 43 are stopped against the thread 123 of the lock screw bolt 12 to prohibit escape of the lock screw bolt 12 from the barrel 2.

As stated above, the stop member 4 is shaped like a conical washer, having a top bearing surface 41 for bearing a pressure from the bottom stop wall 125 of the shoulder 124 of the lock screw bolt 12 and a bottom stop surface 42 positioned in the annular inside locating groove 22 of the barrel 2 for stopping against the thread 123 of the lock screw bolt 12 to prohibit escape of the lock screw bolt 12 from the barrel 2. By means of the application of the stop member 4, the height (length) of the spring member 3 can be minimized so that the metal plate member fixation device can have a low profile characteristic.

A prototype of metal plate member fixation device has been constructed with the features of FIGS. 1 ~8. The metal plate member fixation device functions smoothly to provide all of the features disclosed earlier.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. A metal plate member fixation device for fastening to a mounting through hole of a first metal plate member and a screw hole of a second metal plate member to join said first metal plate member and said second metal plate member together, the metal plate member fixation device comprising:

a locking device insertable through the mounting through hole of said first metal plate member and fastenable to the screw hole of said second metal plate to lock said first metal plate to said second metal plate, said locking device comprising a cap, said cap having a center opening, and a lock screw bolt axially mounted in said center opening of said cap, said lock screw bolt comprising a head fixedly fastened to said cap at one end of the center opening of said cap, a shank perpendicularly extended from a bottom wall of said head, a thread spirally extending around the periphery of one end of said shank remote from said head and suspending outside said cap and a shoulder connected between the bottom wall of said head and said shank, said shoulder defining a bottom stop wall around one end of said shank remote from said thread;

a barrel, said barrel comprising a mounting hole extending through top and bottom sides thereof for the passing of the shank of said lock screw bolt, an annular inside step extending around an inside wall thereof inside the mounting hole near the top side of said barrel and an annular inside locating groove extending around the inside wall inside the mounting hole near the bottom side of said barrel;

a spring member received in the center opening of said cap and stopped between the bottom stop wall of the shoulder of said lock screw bolt and the annular inside step of said barrel; and a compressively deformable annular stop member set in said barrel around the shank of said lock screw bolt and forced into the annular inside locating groove of said barrel to secure said lock screw bolt to said barrel for allowing axial movement of said lock screw bolt relative to said barrel and stopping against one end of the thread of said lock screw bolt to prohibit escape of said lock screw bolt of said locking device from said barrel.

2. The metal plate member fixation device as claimed in claim 1, wherein said cap of said locking device comprises a grip integrally formed of the periphery thereof for gripping by hand to rotate said locking screw bolt; the head of said lock screw bolt has a tool groove located on a top wall thereof.

3. The metal plate member fixation device as claimed in claim 1, wherein said barrel further comprises a beveled inside protrusion protruded from the inside wall thereof an extending along one side of said annular inside locating groove for guiding said compressively deformable annular stop member into said annular inside locating groove upon compression of said compressively deformable annular stop member by said shoulder of said lock screw bolt and stopping said compressively deformable annular stop member in said annular inside locating groove after engagement of said compressively deformable annular stop member in said annular inside locating groove.

4. The metal plate member fixation device as claimed in claim 1, wherein said lock screw bolt is a metal screw bolt; said cap is molded on the head of said lock screw bolt by over-molding.

5. The metal plate member fixation device as claimed in claim 1, wherein said lock screw bolt is a metal screw bolt; said cap is affixed to the head of said lock screw bolt by an engagement structure.

6. The metal plate member fixation device as claimed in claim 1, wherein said barrel comprises a bonding flange located on the bottom side around the mounting hole thereof for bonding to said first metal plate member around the mounting through hole of said first metal plate member, and a bottom extension tube perpendicularly extended from said bonding flange for insertion into the mounting through hole of said first metal plate member for allowing said lock screw bolt to be threaded into the screw hole of said second metal plate member.

7. The metal plate member fixation device as claimed in claim 6, wherein said bonding flange of said barrel is bonded to said first metal plate member around the mounting through hole of said first metal plate member with a solder paste by means of a reflow soldering process.

8. The metal plate member fixation device as claimed in claim 1, wherein said compressively deformable annular stop member is a conical spring washer compressible into a flat shape to reduce the inner diameter thereof for stopping against one end of said thread of said lock screw bolt to prohibit disconnection of said lock screw bolt from said barrel.

9. The metal plate member fixation device as claimed in claim 1, wherein said compressively deformable annular stop member is an internal tooth washer having a plurality of teeth equiangularly spaced around the inside wall thereof.

10. The metal plate member fixation device as claimed in claim 1, wherein said compressively deformable annular stop is made from a high extensible metal material selected from one of brass, zinc alloy and aluminum.

11. The metal plate member fixation device as claimed in claim 1, wherein said compressively deformable annular stop is molded from elastic plastics.

* * * * *